United States Patent [19]

Vestal

[11] 3,744,528

[45] July 10, 1973

[54] TUBE CLOSURE MEMBER
[75] Inventor: George W. Vestal, Denton, Tex.
[73] Assignee: S & V Plastics Incorporated, Denton, Tex.
[22] Filed: Apr. 26, 1971
[21] Appl. No.: 137,433

[52] U.S. Cl. .................... 138/89, 138/96, 220/66
[51] Int. Cl. .................... F16l 55/10, B65d 59/06
[58] Field of Search .................... 138/89, 96, 96 T; 220/42 R, 66

[56] References Cited
UNITED STATES PATENTS

| | | | |
|---|---|---|---|
| 2,977,993 | 4/1961 | Scherer | 138/96 T |
| 3,490,488 | 1/1970 | Grist | 138/89 X |
| 3,610,288 | 10/1971 | Carr | 138/96 |
| R18,669 | 11/1932 | Duffy | 138/96 X |
| 2,857,947 | 10/1958 | Powers | 220/42 CX |
| 2,606,586 | 8/1952 | Hill | 220/42 CX |
| 3,409,167 | 11/1968 | Blanchard | 220/66 |
| 3,430,805 | 3/1969 | Buchner | 220/66 |

FOREIGN PATENTS OR APPLICATIONS

| | | | |
|---|---|---|---|
| 550,250 | 12/1942 | Great Britain | 138/89 |
| 563,775 | 9/1958 | Canada | 220/42 C |
| 1,167,066 | 10/1969 | Great Britain | 220/42 C |

Primary Examiner—Herbert F. Ross
Attorney—Richards, Harris & Hubbard

[57] ABSTRACT

A plastic closure member for a tubular object or a tubular opening which includes an outer lip for fitting snugly over an outside end of a tube, integral with an inner section which extends within the interior of the tubular opening and comprises generally continuous sidewalls enclosing an end section. The lip and the inner section are joined together by a seating section for receiving the end of the tube. The sidewalls of the inner section are sufficiently flexible to allow inversion of the end section in response to pressure within the tube and consequent folding of the sidewalls.

8 Claims, 5 Drawing Figures

PATENTED JUL 10 1973　3,744,528

INVENTOR:
GEORGE W. VESTAL

Richards, Harris & Hubbard
ATTORNEYS

TUBE CLOSURE MEMBER

This invention relates to closures. In another aspect, this invention relates to a novel closure for a tubular opening. In a further aspect, this invention relates to a novel closure member for a tubular object such as a pipe section which prevents the entry of foreign matter into the pipe during storage and handling.

Various devices are known in the art for temporarily sealing tubular members from either ingress or egress of materials. For example, a large number of protective closures are known in the art for temporarily sealing sections or lengths of pipe during storage and shipment. More specifically, in the storage, shipment, and handling of both metallic and non-metallic, e.g., concrete pipe sections, it is generally desirable to prevent accumulations of dust, dirt, water vapor and other foreign matter within the pipe. The protection provided by such closure members is particularly desirable during storage and handling of certain metallic pipes to be used in transporting refined petroleum products, for example. In such instances, the pipe is cleaned at the mill and should be kept clean until it is ready for use. Furthermore, the accumulation of moisture in such pipes enhances the chances for rust formation and for other corrosive processes to begin.

Most conventional closures suitable for sealing the ends of tubular conduits such as pipe sections, suffer from drawbacks such as being designed only to work on threaded conduits, or that they require detailed manipulation during installation on the end of a pipe, or that they have been difficult to maintain in position because of the expansion and contraction of gases within the pipe during temperature changes, or that they are easily jarred loose during periods of rough handling or accidental droppage of the pipe sections.

Therefore, one object of this invention is to provide a novel closure member for tubular objects.

Another object of this invention is to provide a novel closure member for tubular objects such as pipe segments, which is easy to insert, will tenaciously remain in place during rough handling and expansion and contraction of gases within the pipe due to temperature changes.

According to the invention, a novel plastic closure member for a tubular opening is provided which generally comprises an outer annular retaining lip adapted to fit snugly about the end section of a tube in cooperation with an inner section generally comprising continuous sidewalls, generally shaped to conform to the inner periphery of the tube, which sidewalls enclose a flexible end section, the annular lip and the inner section being joined by a seating section for receiving the end of the open tube. The end section of the inner section as well as portions of the sidewalls adjacent the end section are sufficiently flexible to distort in response to pressure variations within the tube, and when increases in pressure occur, the end section will invert within the sidewalls of the inner section, causing adjacent portions of the sidewalls to overlap.

This invention can be more easily understood from a study of the drawings in which.

Figure 1:
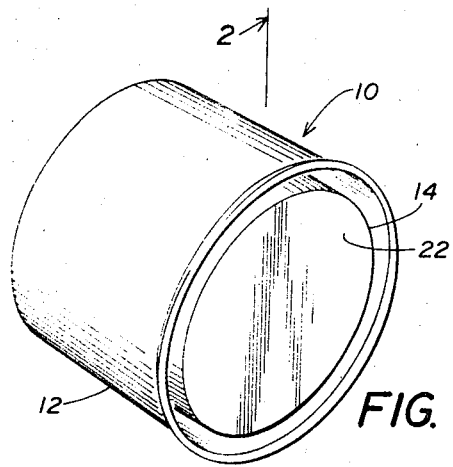
FIG. 1 is a perspective view of the closure member of this invention.

Now referring to the drawings and in particular to FIG. 1, closure member 10 generally comprises an annular outer lip 12 in combination with an inner deformable section 14.

Figure 2:
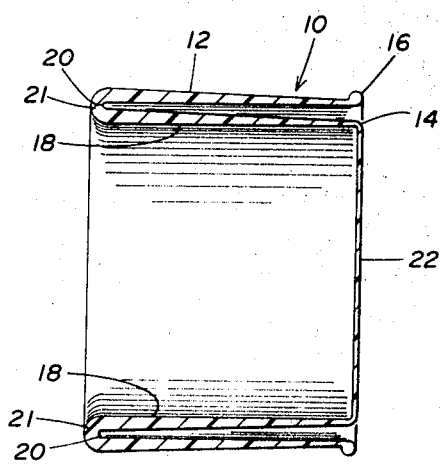
FIG. 2 is a sectional view taken along lines 2—2 of FIG. 1.

Closure member 10 is illustrated more specifically in FIG. 2, which is a sectional view along lines 2—2 of FIG. 1. As shown, closure member 10 is made of a resilient, flexible material. Suitable such materials include low density polyethylene, natural and synthetic rubbers, high impact polystyrene, and the like. Outer annular lip 12 preferably carries a reinforcing bead 16 on the outside portion of the end thereof. Outer annular lip 12 is slightly smaller in diameter than the outside diameter of the tubular body to be sealed. Thus, the material of which closure member 10 is made must be sufficiently resilient to slightly expand and contract. Outer annular lip 12 rests in opposed relationship to sidewalls 18 of inner deformable section 14 and are joined thereto via seating section 20, which is adapted to receive the end of the tubular body to be sealed. Sidewalls 18 enclose end section 22 of inner deformable section 14. It is generally preferred that lip 12 and sidewalls 18 have lengths of at least one-half the average diameter of the tube which is being sealed, and most preferably they are the same length.

It is noted that the particular thickness of outer annular lip 12, seating section 20, sidewalls 18, and end sections 22 can vary with the particular structural material which is being used as well as the particular purpose for enclosing the tube. However, for more efficient operation in situations where sections of pipe are being plugged with closure 10, it is generally preferred that the thickness of the plastic material forming the seating section 20, and of both outer annular lip 12 and sidewalls 18 at the regions adjoining seating section 20 have a thickness of from about 1.5 times to about four times the thickness of end section 22, and the portions of sidewalls 18 adjoining end section 22 as well as the end of the outer annular lip 12 adjoining bead 16. In this regard, it is generally preferred that the thickness of sidewalls 18 uniformly taper between the thickness at the base of the sidewalls adjoining seating section 20 to the intersection with end section 22. Likewise, it is generally preferred that the thickness of outer annular lip 12 generally taper at the base thereof adjoining seating section 20 to the outer portion thereof adjoining bead 16. In addition, it is preferred that the material behind seating section 20 at points 21 also be of a thickness of about 1.5 to about four times the thickness of end section 22. This increased thickness will provide protection and act as a "bumper" if the end of the pipe is jarred against another object.

Figure 3:
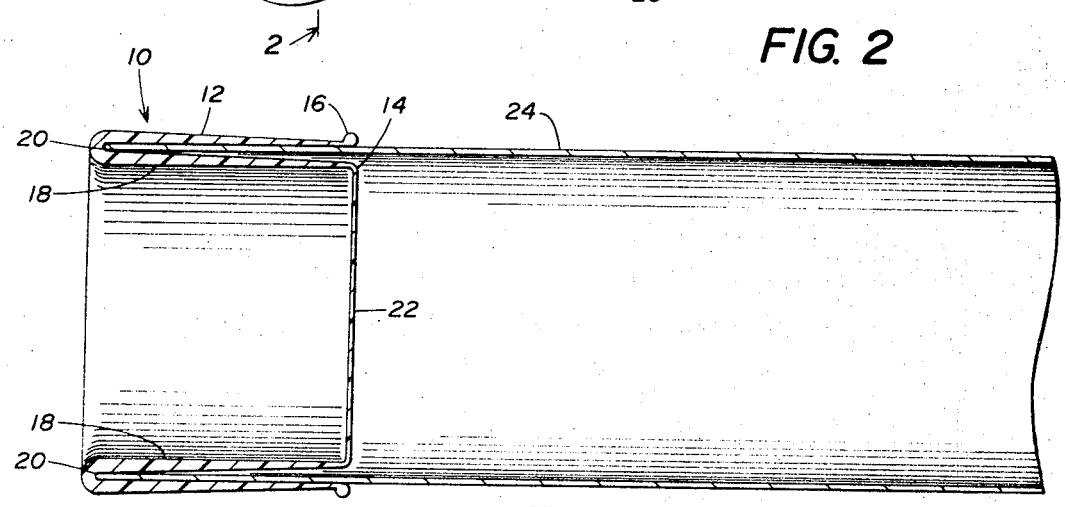
FIG. 3 is a cross sectional view showing the closure member of FIG. 1 in place in the end of a pipe section.

FIG. 3 is a sectional view showing closure member 10 operatively positioned in sealing relationship on the end of pipe 24. As shown, inner deformable section 14 is slightly smaller in size but substantially the same shape as the internal periphery of pipe 24, and extends fully within the end of pipe 24 such that the end of pipe 24 seats against seating section 20 as illustrated in FIG.

3. Outer annular lip 12 is slightly smaller in size than the outside periphery of pipe 24 and is stretched over the outside of pipe 24 so that it snugly fits the circumference thereof. When in position in this manner, closure member 10 will effectively prohibit ingress of contaminating material to the interior of pipe 24. In addition, if pipe 24 contains a flowable material, closure member 10 will prevent its escape therefrom. In this latter instance, many times it is desirable to fill each section of concrete pipe approximately 1/3 with water before being stacked on a carrier and shipped overland. When closure members 10 are affixed to either end of a concrete pipe containing water, they will prevent the leakage of water from the pipe. The filling operation can be conveniently accomplished by affixing a closure member 10 to one end of the concrete pipe and tilting it slightly, filling it with the desired amount of water and capping the other end with another closure member 10. The pipe can then be positioned horizontally for shipment.

In addition to preventing both the ingress and egress of material to and from the interior of the pipe, respectively, closure member 10 will not become loosened and disengaged from the end of pipe 24 due to rough handling or accidental droppage of the pipe because outer annular lip 12 snugly fits the pipe and will sufficiently withstand these forces. In addition, closure member 10 will remain in place in the pipe even when pressure variations occur within the pipe due to expansion and contraction of gases therewithin caused by temperature changes.

Figure 4:
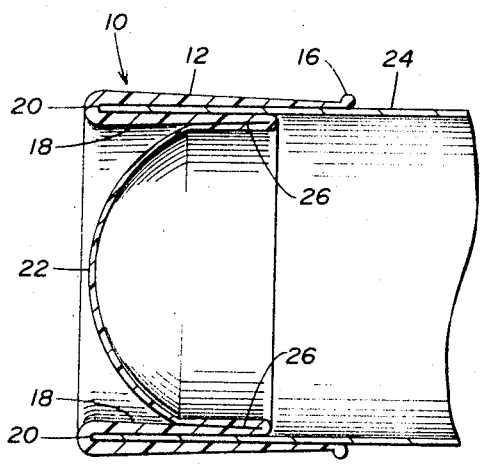
FIG. 4 is a sectional view of the closure member of this invention placed in the end of a pipe section when the pressure in the pipe section has increased substantially greater than atmospheric.

FIG. 4 illustrates the action of closure member 10 in response to a pressure buildup within the interior of pipe 24 which is greater than atmospheric. As illustrated, when a pressure increase occurs within the interior of pipe 24, end section 22 will become inverted within inner deformable section 14 and thereby causes an overlapping of adjacent portions of sidewalls 18, as illustrated at points 26. This overlapping action together with a positive gas pressure in the interior of tube 24, thereby causes an outward force to be inserted against the walls of pipe 24 at the points of overlap 26 to thereby provide a "secondary locking action" of closure member 10 within the end of pipe 24. This secondary locking action will occur to some degree whether or not the sidewalls 18 are tapered in thickness, as illustrated in the drawing. However, when higher pressures are to be encountered within a particular pipe, it is generally preferred to form sidewalls 18 of a variable thickness so that they taper in the manner described above. In this respect, it is noted that the reinforcing strength can be imparted to sidewalls 18 without actually tapering the thickness of sidewalls 18 between seating section 20 and end section 22. This can be accomplished by merely having a step change in thickness at any predetermined point or points along the length of sidewall 18. For example, sidewall 18 can have a thickness from about 1.5 to about four times the thickness of end section 22 along the length extending from seating section 20 to a predetermined point for example, 50 to 75 percent the length of the sidewalls, at which time the thickness of sidewall 18 termintates to approximately the thickness of end section 22.

Figure 5:
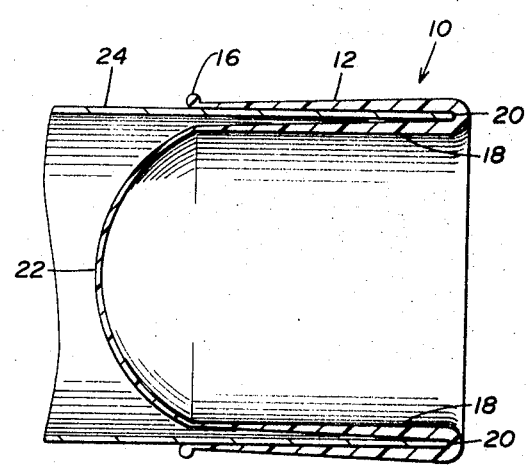
FIG. 5 is a cross-sectional view showing the closure member of this invention in place in the end of a pipe section wherein the pressure within the pipe section is substantially lower than atmospheric.

FIG. 5 shows the functioning of closure member 10 when pressure within pipe 24 becomes less than atomspheric, for example, due to the cooling of gases within pipe 24. As shown, end section 22 deforms in an arcuate manner due to the greater pressure on the outside of the pipe. Portions of sidewalls 18 may also deform. This action will merely draw seating section 20 closer in sealing engagement against the end of the open pipe 24, and thereby reinforce the seal by a "secondary locking action."

Thus, the closure member of this invention can be utilized to effectively seal any type of tubular opening. For example, round tubes such as pipes, made of metal and cement, as well as oval and other shaped tubes such as square shaped tubes. The outer annular lip made of a resilient material is slightly smaller in diameter than the outside diameter of the tube and therefore snugly fits the end of the pipe and will prevent closure member 10 from being loosened due to rough handling or accidental dropping of the tube. In addition, the "secondary locking actions" as set forth and discussed in regards to FIGS. 4 and 5, provide additional sealing action of closure member 10 within a tube due to either pressure increases or pressure decreases from the tube. The closure member can be removed from the end of the tube by any suitable means, such as cutting outer annular lip 12 with a knife. In addition to the other advantages set forth above, the closure member of this invention can be utilized to seal the ends of pipe segments and will not prevent the use of conventional means for lifting the pipe, such as slings which fit within the ends of the pipe. Such mechanism can easily fit within the opening of the sealed pipes when lifting and transporting the pipes in conventional pipe handling operations.

While this invention has been described in relation to its preferred embodiments, it is to be understood that various modifications thereof will now be apparent to one skilled in the art upon reading this specification and it is intended to cover such modifications as fall within the scope of the appended claims.

I claim:

1. A plastic closure member for enclosing an open end of a tubular body and for maintaining a seal of said opening during pressure fluctuations within said tubular body comprising:

a. an annular outer lip shaped to fit snugly in frictional engagement over the outer end section of a tube such that when in position on the tube, its first end extends around the circumference of the tube while the second end thereof is positioned adjacent the opening of the tube;

b. a seating section extending inwardly from said second end for receiving the end of said tube in seating relationship;

c. an inner section, generally conforming to the internal configuration of the tube comprising continuous sidewalls extending from said seating section and in opposed relationship to said lip and enclosing an end section comprising a continuous flexible web, said end section being deformable in an arcuate manner toward the interior of said tube and also toward the open end thereof in response to pressure fluctuations within said tube, said sidewalls adjoining said end section, being flexible to thereby allow inversion of said end section therewithin and overlapping of said sidewalls adjacent said end section in response to a pressure increase within said tube said sidewalls adjacent said seating section having a thickness of from about 1.5 to about four times the thickness of said end section and said sidewalls adjacent said end section, and the thickness of the sidewalls therebetween tapers from said seating section to said end section to allow said inversion.

2. The closure member of claim 1 further comprising an integrally molded bead positioned on the outside of said first end of said lip.

3. The closure member of claim 1 wherein said lip and said sidewalls are approximately of equal length such that said first end of said lip and said end section of said inner section are in opposed spacial relationship.

4. The tubular closure member of claim 1 shaped to fit the end of a cylindrical conduit.

5. A tube closure member molded from a resilient plastic material for enclosing the open end of a tubular body and for maintaining a seal of said opening during pressure fluctuations within said body comprising:
   a. an annular outer lip shaped to fit snugly in frictional engagement over the outer end section of a tube such that when in position on the tube, its first end extends around the circumference of the tube while the second end thereof is positioned adjacent the opening of the tube, said lip having an inner continuous arcuate surface, a diameter which is slightly smaller than the outside diameter of said tube, and a length which is at least one-half the average diameter of said tube;
   b. a seating section extending inwardly from said second end for receiving the end of said tube in seating relationship;
   c. an inner section generally conforming to the internal configuration of the tube comprising continuous sidewalls having approximately the same length as said lip and extending from said seating section and in opposed relationship to said lip and enclosing an end section comprising a continuous flexible web, said end section being deformable in an arcuate manner toward the interior of said tube and also toward the open end thereof in response to pressure fluctuations within said tube, said sidewalls adjoining said end section, being flexible to thereby allow inversion of said end section therewithin and overlapping of said sidewalls adjacent said end section in response to a pressure increase within said tube said sidewalls adjacent said seating section having a thickness of from about 1.5 to about four times the thickness of said end section and said sidewalls adjacent said end section, and the thickness of the sidewalls therebetween tapers from said seating section to said end section to allow said inversion.

6. The tube closure member of claim 5 further comprising an integrally molded bead positioned on the exterior of the end of said lip.

7. The tube closure member of claim 6 wherein the thickness of said engaging lip adjacent said seating section is greater than the thickness of said engaging lip adjacent said bead.

8. The tube closure member of claim 7 wherein the thickness of said engaging lip adjacent said seating section is from about 1.5 to about four times the thickness of said engaging lip adjacent said bead, and the thickness of said engaging lip therebetween tapers from said seating section to said bead.

* * * * *